US012711756B2

(12) United States Patent
Cho et al.

(10) Patent No.: US 12,711,756 B2
(45) Date of Patent: Aug. 18, 2026

(54) METHOD AND APPARATUS WITH OBJECT DETECTION FOR AUTONOMOUS VEHICLE

(71) Applicant: Samsung Electronics Co., Ltd., Suwon-si (KR)

(72) Inventors: Junho Cho, Suwon-si (KR); Moonsub Byeon, Suwon-si (KR); Dongwook Lee, Suwon-si (KR); Dae Ung Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 252 days.

(21) Appl. No.: 18/661,277

(22) Filed: May 10, 2024

(65) Prior Publication Data

US 2025/0131707 A1 Apr. 24, 2025

(30) Foreign Application Priority Data

Oct. 19, 2023 (KR) ........................ 10-2023-0140474

(51) Int. Cl.

| | |
|---|---|
| ***G06V 10/94*** | (2022.01) |
| ***G06V 10/764*** | (2022.01) |
| ***G06V 10/774*** | (2022.01) |
| ***G06V 10/82*** | (2022.01) |
| ***G06V 20/58*** | (2022.01) |
| ***G06V 20/70*** | (2022.01) |

(52) U.S. Cl.
CPC ............ *G06V 10/95* (2022.01); *G06V 10/764* (2022.01); *G06V 10/774* (2022.01); *G06V 10/82* (2022.01); *G06V 20/58* (2022.01); *G06V 20/70* (2022.01)

(58) Field of Classification Search
CPC ........ G06V 10/95; G06V 20/70; G06V 20/58; G06V 10/82; G06V 10/774; G06V 10/764
USPC .......................................................... 382/103
See application file for complete search history.

(56) References Cited

FOREIGN PATENT DOCUMENTS

| | | | |
|---|---|---|---|
| CN | 114999228 | A | 9/2022 |
| CN | 115402349 | A | 11/2022 |

(Continued)

OTHER PUBLICATIONS

Valanarasu, Jeya Maria Jose, Rajeev Yasarla, and Vishal M. Patel. "Transweather: Transformer-based restoration of images degraded by adverse weather conditions." Proceedings of the IEEE/CVF conference on computer vision and pattern recognition. 2022. (Year: 2022).*

(Continued)

*Primary Examiner* — Jonathan S Lee
(74) *Attorney, Agent, or Firm* — NSIP Law

(57) ABSTRACT

Provided are an object detection method and apparatus for an autonomous vehicle. A method of controlling a vehicle includes: detecting a surrounding environment using pieces of data on a driving environment of the vehicle and generating an indication of the surrounding environment; determining, among trained visual prompts received via a network from a server, a target visual prompt corresponding to the pieces of data; generating a merged image by combining a driving image of the autonomous vehicle with the target visual prompt using a predetermined operation; and performing object detection by inputting the merged image into a neural network model of the vehicle, the neural network model configured to infer objects from images inputted thereto.

20 Claims, 9 Drawing Sheets

(56) References Cited

FOREIGN PATENT DOCUMENTS

| | | | |
|---|---|---|---|
| KR | 10-2342414 | B | 5/2019 |
| KR | 10-2019-0054374 | A | 12/2021 |

OTHER PUBLICATIONS

Saravanarajan, Vani Suthamathi, et al. "Improving semantic segmentation under hazy weather for autonomous vehicles using explainable artificial intelligence and adaptive dehazing approach." IEEE Access 11 (2023): 38194-38207. (Year: 2023).*

Jia et al. "Visual Prompt Tuning" *ariXiv preprint: arXiv:2203.12119v2* Jul. 20, 2022.

Gan et al "Decorate the Newcomers: Visual Domain Prompt for Continual Test Time Adaptation" *Proceedings of the AAAI Conference on Artificial Intelligence*. vol. 37. No. 6. 2023 (pp. 7595-7603).

Bahng et al. "Exploring Visual Prompts for Adapting Large-Scale Models" *ariXiv preprint arXiv:2203.17274v2* Jun. 3, 2024 (pp. 1-16).

* cited by examiner

METHOD AND APPARATUS WITH OBJECT DETECTION FOR AUTONOMOUS VEHICLE

CROSS-REFERENCE TO RELATED APPLICATIONS

This application claims the benefit under 35 USC § 119 (a) of Korean Patent Application No. 10-2023-0140474, filed on Oct. 19, 2023, in the Korean Intellectual Property Office, the entire disclosure of which is incorporated herein by reference for all purposes.

BACKGROUND

1. Field

The following description relates a method and apparatus with object detection for an autonomous vehicle.

2. Description of Related Art

In the recent commercialization of autonomous vehicles, the typical operational design domain (ODD) is a highway on a clear day. However, autonomous vehicles traveling in actual scenarios face exceptional driving conditions on roads, for example, nighttime conditions, bad weather conditions, tunnel conditions, etc. The surrounding environments of autonomous vehicles change rapidly and, due to the characteristics of the vehicles, fast and accurate object detection can be beneficial. Object detection performance is challenging in the rapidly changing environmental conditions and limited computational capacity of autonomous vehicles.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a computing device includes one or more processors and a memory storing instructions configured to cause the one or more processors to: obtain, from a camera of a vehicle, a driving image; receive, by the vehicle, via a network, driving environment information specification to a location of the vehicle; obtain, from a sensor of the vehicle, data of a surrounding environment of the vehicle; receive, from a server, trained visual prompts provided by the server based on the driving image and based on the driving environment information and the surrounding environment information; select, from among the trained visual prompts received from the server, a target visual prompt corresponding to the driving environment information and the data of the surrounding environment; generate a merged image by combining the driving image with the target visual prompt using a predetermined operation; and perform object detection by inputting the merged image into a neural network model trained to perform object detection.

The predetermined operation may include adding the target visual prompt to the driving image or concatenating the target visual prompt with the driving image.

The instructions may be further configured to cause the one or more processors to select a second target visual prompt from among the trained visual prompts, assign weights to the target visual prompt and second target visual prompt, respectively, and use the weights to combine the selected target and second visual prompts with the driving image.

The data of the surrounding environment and the driving environment information are classified into values of predefined environment classes of a current driving environment of the vehicle.

The classified values may be used to generate and train the visual prompts.

The driving environment information may include a weather forecast, a traffic condition, a traffic regulation, or a traffic signal system.

In another general aspect, a server is configured to: receive, via a network, from a vehicle, a driving image and current driving environment data of the vehicle; classify components of the current driving environment data according to predetermined categorization criteria to generate values of driving environment categories; generate visual prompts based on the values of the driving environment categories, each visual prompt respectively corresponding to a driving environment category and having content based on a respectively corresponding value in the corresponding driving environment category; update the visual prompts according to gradients thereof that are determined based on the driving image of the vehicle; train the visual prompts based on a result of the updating; and transmit the trained visual prompts via the network to the autonomous vehicle.

The driving environment categories may include a time-of-day, weather, or a setting.

The server may be configured to label the visual prompts based on the driving environment categories.

The server may be configured to, based on an uncertainty level of an object detection result received from the vehicle, update the gradients of the visual prompts by using a test image.

The server may be configured to compare a reference visual prompt stored in the server with each of the visual prompts to tune parameters of each of the visual prompts based on the gradients and store the tuned parameters of each of the visual prompts in each of the visual prompts.

The visual prompts may be respective tensors, wherein the gradients correspond to differences between the driving image and the tensors, and wherein values of the tensors are updated according to the gradients.

In another general aspect, a method of controlling a vehicle includes: detecting a surrounding environment using pieces of data on a driving environment of the vehicle and generating an indication of the surrounding environment; determining, among trained visual prompts received via a network from a server, a target visual prompt corresponding to the pieces of data; generating a merged image by combining a driving image of the autonomous vehicle with the target visual prompt using a predetermined operation; and performing object detection by inputting the merged image into a neural network model of the vehicle, the neural network model configured to infer objects from images inputted thereto.

The predetermined operation may include adding or concatenating the target visual prompt to the driving image.

The generating of the merged image may include: selecting a second target visual prompt from among the trained visual prompts based on the pieces of data; and assigning weight to the target visual prompt and the second visual prompt and combining the target visual prompt and the second visual prompt with the driving image according to the weights.

The may further include: generating an original visual prompt based on a value of a category of a driving environment category determined based on the pieces of data; and training the original visual prompt to generate one of the trained visual prompts, the training based on the original visual prompt and the driving image of the autonomous vehicle.

In another general aspect, a method of controlling a server includes: receiving, from a vehicle, pieces of data on a driving environment; determining values of predefined driving environment categories based on the pieces of data and generating visual prompts according to the values of the predefined driving environment categories; determining gradients of the visual prompts based on the visual prompts and based on a driving image of the vehicle; updating the visual prompts according to the gradients; training the visual prompts based on a result of the updating; and transmitting the trained visual prompts to the vehicle.

The predefined driving environment categories may include driving time-of-day, surrounding weather, and setting.

The method may further include: based on an uncertainty level of an object detection result received from the vehicle, updating the gradients of the visual prompts based on test data defined in advance.

The updating of the gradients of the visual prompts may include comparing a reference visual prompt stored in the server with each of the visual prompts to tune parameters of each of the visual prompts based on the gradients and store the parameters of each of the visual prompts in each of the visual prompts.

Other features and aspects will be apparent from the following detailed description, the drawings, and the claims.

Figure 1:
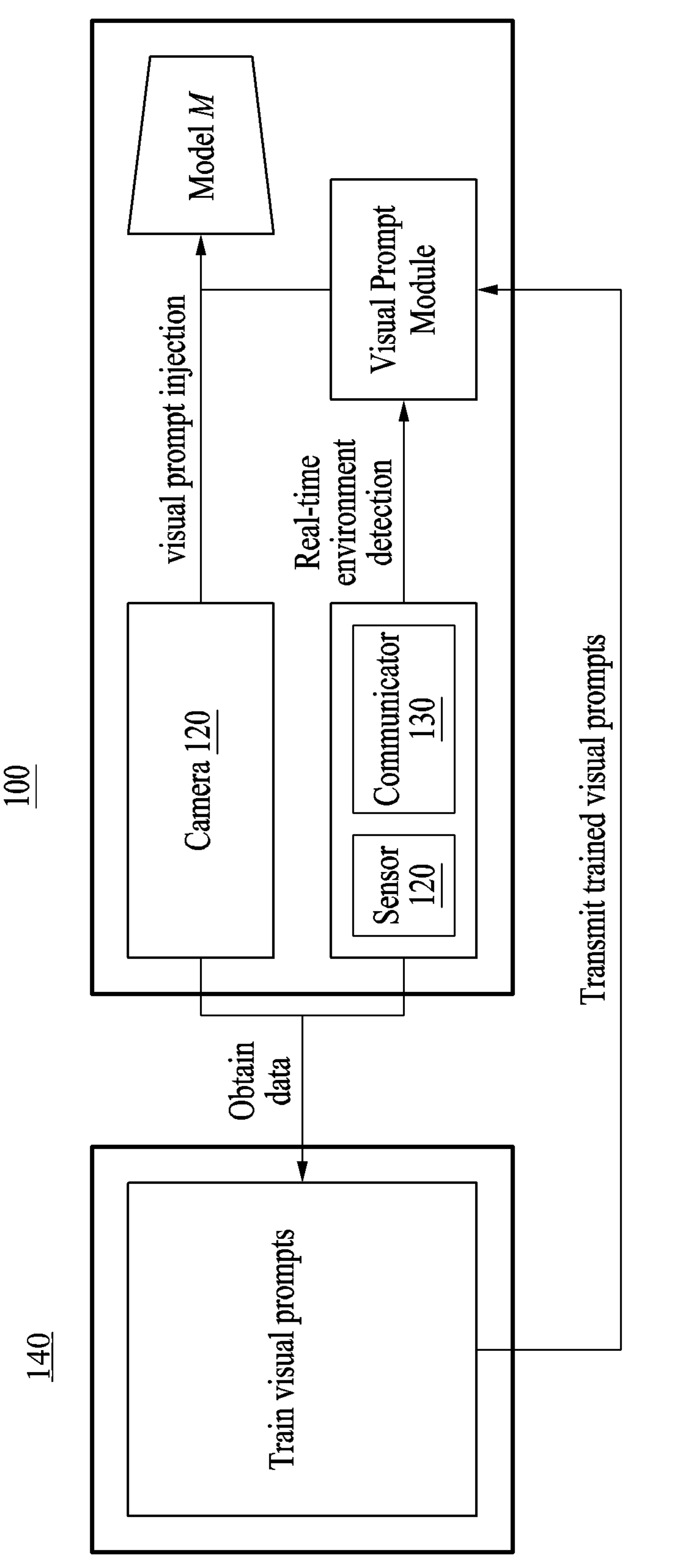
FIG. 1 illustrates an example of object detection for an autonomous vehicle, according to one or more embodiments.

Throughout the drawings and the detailed description, unless otherwise described or provided, it may be understood that the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of object detection for an autonomous vehicle, according to one or more embodiments.

As illustrated in FIG. 1, one or more blocks and a combination thereof may be implemented by a special-purpose hardware-based computer that performs a predetermined function or a combination of computer instructions and special-purpose hardware.

Figure 9:
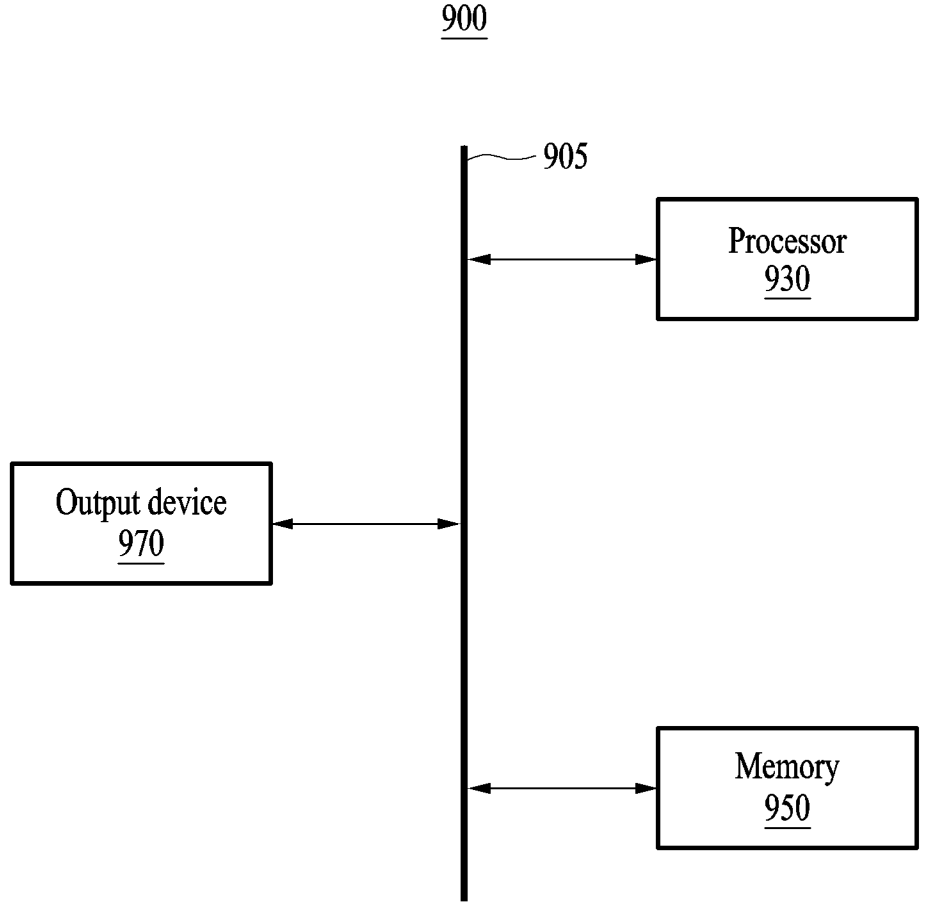
FIG. 9 illustrates an example electronic device, according to one or more embodiments.

Referring to FIG. 1, an autonomous vehicle 100 may include a camera 110, a sensor 120, a communicator 130, and a processor (e.g., a processor 930 of FIG. 9). Although FIG. 1 does not illustrate the processor 930 in detail, the processor 930 may perform a series of operations to perform object detection in the autonomous vehicle 100.

The autonomous vehicle 100 may obtain local driving environment data through the sensor 120. The autonomous vehicle 100 may be equipped with multiple sensors (e.g., the sensor 120) for driving, possibly of different type. Examples of the sensor 120 mounted on an autonomous vehicle 100 are described below with reference to FIG. 4.

The autonomous vehicle 100 may receive remote driving environment data via a network from an external resource through the communicator 130. For example, the autonomous vehicle 100 may receive information about the weather and day/night of a current location of the vehicle from a meteorological administration application programming interface (API), a sunrise/sunset API, and the like. In addition, the remove driving environment data obtained by the autonomous vehicle 100 through the communicator 130 may include a traffic signal system, a traffic regulation, a traffic condition, and/or a weather forecast based on the location and country in which the autonomous vehicle 100 is currently driving, to name some non-limiting examples. Remote driving environment data may also be obtained from other vehicles using a vehicle-to-vehicle communication protocol.

The autonomous vehicle 100 may obtain and/or derive data on its current driving environment (current driving environment data) such as information about the time of day (day and night), about the weather, about a setting (e.g., type of highway), and time based on the remote/local driving environment data obtained from the sensor 120 and/or the communicator 130. The processor 930 may detect a surrounding environment using pieces of data on the driving environment. Furthermore, the autonomous vehicle 100 may obtain local driving environment/vehicle data such as an indication of its current velocity, a calibration value of the camera 110, or the like, through a Controller Area Network (CAN) communication. CAN communication is a communication standard designed for microcontrollers or devices within vehicle to communicate with each other without needing an intermediary host computer. In some implementations, the current driving environment data may be derived by grouping, synthesizing, etc. the local/remote driving environment data.

The autonomous vehicle 100 may obtain a driving image of the autonomous vehicle 100 through one or more cameras (e.g., 110) attached to the vehicle. The cameras (e.g., 110) may capture different driving images depending on the attachment locations of the cameras; a driving image being an image of external setting of the vehicle while the vehicle is driving. The autonomous vehicle 100 may transmit the driving images obtained from the cameras (e.g., 110) to a server 140 and may use the driving images to perform object detection through the processor 930.

The processor 930 may classify information obtained through the sensor 120 and the communicator 130 (current driving environment data) into environment classification datasets, as shown in Table 1. One or more environment categories/classes (time, weather, setting, e.g.) may have one or more values set therefor, according to the current driving environment data. Such classifying may be done by a neural network model, predefined logic for the formats/types of the current driving environment data, etc. In some cases, the current driving environment data may map directly to an environment class and value thereof.

TABLE 1

| Category | Environment |
|---|---|
| Time | daytime, night, dawn/dusk |
| Weather | rainy, snowy, clear, overcast, partly cloudy, foggy |
| Setting | tunnel, residential, parking lot, city street, gas stations, highway |

As shown in Table 1, the processor 930 may classify the obtained current driving environment data into values of environment classes such as time, weather, and setting. The example classes/values in Table 1 are non-limiting examples; velocity of the autonomous vehicle 100 or the like may be utilized.

The autonomous vehicle 100 may receive a trained visual prompt from the server 140. The trained visual prompt may be generated on the server 140 based on driving environment data from the autonomous vehicle 100. A process of the server training a visual prompt is described below.

The server 140 may receive driving environment data from the autonomous vehicle 100. The data may be the classification dataset(s) described above (e.g., Table 1 data derived from the vehicle's current driving environment data). Alternatively, the server 140 may receive the current driving environment data from the autonomous vehicle 100 and group/classify the pieces of data on the current driving environment (the current driving environment data) according to predetermined criteria. That is, the server 140 may perform the environment classification described above with reference to the autonomous vehicle 100. The classification/group data may be used by the server 140 to generate visual prompts. That is to say, the server 140 may receive pieces of data on the driving environment, as shown in Table 1, or group pieces of data received from the autonomous vehicle 100 according to predetermined criteria (i.e., "raw" received/sensed environment data).

Regarding the classifying, there may be a difference between the local classifying of a vehicle and a server's classification. In some embodiments, classification may be performed by a vehicle and also by a server, however, the server may contain a stronger classification model, so even if classification is performed by the vehicle, re-classification can be performed with a stronger model to fit the server's model. Therefore, although classification can be performed by both a vehicle and a server, if the data classified by the autonomous vehicle does not fit the server's model, it can be re-classified on the server. Also, server-based grouping may involve grouping re-classified data to suit the server's model.

In the one case, the predetermined criteria may be criteria for grouping the pieces of data received from the autonomous vehicle 100 into categories based on the types of the pieces of data. The categories may refer to criteria for classifying data as the data signifies, such as the driving time of the autonomous vehicle 100, the surrounding weather of the autonomous vehicle 100, and the setting of the autonomous vehicle 100. The predetermined criteria and the categories are not limited to the provided examples.

A visual prompt may be generated into different forms, such as a tensor with the same dimensions as an input image, a form in which only a padding part (a relatively thick rectangular border; see FIG. 8) is trainable, or a form that is learnable in the form of a patch. For example, a visual prompt may be a tensor that allows an addition operation; benefits of addition following the commutative property are discussed further below. A visual prompt may be a tensor with the same dimensions as an input image and may limit a region to learn padding or a predetermined patch part. Additionally, due to the commutative property of addition, visual prompts of arbitrary/varying forms may be added to an input image through a differentiable function (one capable of differentiation). Therefore, a gradient calculated from a loss function of the differentiable function may be backpropagated to a visual prompt to allow learning of the visual prompt. As described below, visual prompts may be generated using only one set of data, e.g., ρ_time-daytime, ρ_weather-rainy, and ρ_setting-highway, as a non-limiting example; visual prompts may be generated by combining multiple sets of data.

Unlike the training of previous existing object detection models, training of a visual prompt may involve updating the gradient of the visual prompt, where an addition or concat operation is performed on a driving image (I) of the autonomous vehicle 100, without necessarily having to tune the parameters of an object detection model. The server 140 may label visual prompts based on the pieces of data grouped into the categories through the training of the visual prompts.

For example, when the server 140 receives pieces of data corresponding to a driving image captured in an environment such as during-the-day, in-clear-weather, and on-a-highway, under such conditions, the server 140 may receive pieces of data associated with the driving image, which may include a "daytime" data (a time category of data), "clear" data (a weather category of data), and "highway" data (a setting category of data) from the autonomous vehicle 100. The server may also receive the driving image. The server 140 may generate, based on the received pieces of data, a first visual prompt (ρ_time-daytime), a second visual prompt (ρ_weather-clear), and a third visual prompt (ρ_setting-highway). The server 140 may compare each of the first visual prompt, the second visual prompt, and the third visual prompt with a respectively corresponding reference visual prompt to measure and update the gradients of the first visual prompt, the second visual prompt, and the third visual prompt (updating the gradients by updating the updating the contents of the visual prompts accordingly). The server 140 may tune the parameters of the first visual prompt, the second visual prompt, and the third visual prompt based on their respective gradients and may store the tuned parameters in the respective visual prompts.

Before returning discussion of server-related processes, some overview is now provided. Regarding the notion of visual prompts, a visual prompt may be a kind of directive (e.g., text) that may be appropriate for the environment and may be learned. A visual prompt may be a gradient expressed (e.g., like noise) that visually implies information related to the environment of an image. The term "visual prompt" may, in some implementations, refer to any pixel-space modification to (or supplementation of) the input image for model adaptation. Some embodiments and examples described herein relate to a model for learning a "visual prompt" added to an image; the object recognition model itself may be fixed, and the result of the object recognition model may be adapted in a desired direction. That is, while the object recognition model itself may be fixed, the model for learning the visual prompt may be a learning model that stores the gradient according to the environment of the visual prompt based on the result of the object recognition model.

Furthermore, regarding the idea of a reference visual prompt, a reference visual prompt may correspond to the initial value for learning the desired visual prompt, which may initially be random noise data, or, if the model is in the middle of continuous learning, it may be a value that can be additionally updated (like fine tuning) for the intermediate result. In other words, it may be a random noise value at the beginning, but if there is a previously made value, that previous value may be the reference visual prompt.

Regarding what the above-mentioned gradient is a gradient of, a generated visual prompt may be dynamically created (or modified) based on current environmental data captured by the vehicle's sensors. A purpose of utilizing gradients to update visual prompts may be to continuously improve the performance of the object detection system. As the environmental conditions change, the system may adapt by refining its visual prompts, ensuring the neural network model remains effective across a range of scenarios.

Returning to server-related processes, the server 140 may transmit, as an update result to the autonomous vehicle, the trained visual prompts in which the tuned parameters are stored.

The trained visual prompts are not limited to the provided examples and may vary depending on data received from the autonomous vehicle 100.

The autonomous vehicle 100 may receive the trained visual prompts from the server 140 through the communicator 130 (e.g., a network interface such as a cellular module). The processor 930 may determine/select, from among the received trained visual prompts, a target visual prompt that is appropriate for the pieces of data on the driving environment (regarding "the" pieces of data, the processor 930 may timely determine/select, from among the received trained visual prompts, a target visual prompt that is appropriate for the current environment in which the vehicle is driving, i.e., the processor 930 of the vehicle may determine/select the target visual prompt by analyzing data on a real-time driving environment). For example, when the autonomous vehicle 100 receives the trained visual prompts (e.g., the first, second and third visual prompts), the autonomous vehicle 100 may obtain (or already have) data on the current driving environment. When the obtained/available data is "daytime" data, the processor 930 may select the first visual prompt to be the target visual prompt (which may be performed by a visual prompt module).

The visual prompt module is executed by the processor 930 and may store trained visual prompts received from the server 140 and select a one or more of the trained visual prompts (trained by the server based on the pieces of data on the driving environment) to be the target visual prompt.

Incidentally, the aforementioned module may be a unit including one or a combination of two or more of hardware, software (instructions), or firmware. The term "module" may be interchangeably used with other terms, such "unit," "logic," "logical block," "component," or "circuit." The module may be a minimum unit of an integrally formed component or part. The module may be a minimum unit for performing one or more functions thereof. The module may include any one or any combination of any two or more of an application-specific integrated circuit (ASIC) chip, field-programmable gate arrays (FPGAs), or a programmable-logic device that performs known operations or operations to be developed.

The processor 930, e.g., of the autonomous vehicle 100, may use a predetermined operation to generate a merged image by combining/merging the driving image of the autonomous vehicle 100 with the target visual prompt. The predetermined operation may be addition/concatenation of the target visual prompt with the driving image. The predetermined operation is described with reference to FIG. 5.

The processor 930 may input the merged image into a local neural network model (e.g., an object detection model) which performs object detection on the merged image to infer object(s) in the merged image (e.g., object boundary, object class, object location, etc.). With the above-described method, the object detection model may be maintained (e.g., not necessarily trained) whereas visual prompts may be tuned/trained. The weight (e.g., weights of nodes) of the object detection model may be shared with the server 140 and the autonomous vehicle 100 so that both have the same model (or at least overlapping/common weights), and the autonomous vehicle 100 may receive benefit of the server 140 by receiving only trained visual prompts from the server 140 (additional explanation of the sharing is provided below). Since there may be trained visual prompts of types respectively corresponding to each of various potential environments that the autonomous vehicle 100 may be in, the object detection model may perform an environment-appropriate object detection inference operation based on the merged image that includes environment-appropriate data since the driving image is merged with a trained/target visual prompt that is environment-appropriate. For example, when the driving situation (environment) is "rainy", the object detection model may perform inference by combining a corresponding "rainy" trained visual prompt (or several) with a "rainy" driving image.

Regarding the sharing noted above, the parameters and weights of the object recognition model(s) included in the server and vehicle are fixed (frozen) so that the server only uses the object detection model when learning visual prompts and does not update the object detection model itself. The vehicle may use the same object detection model as the server, may receive a learned visual prompt from the server, and may use the learned visual prompt as input to the object detection model.

In general, the driving environment of the autonomous vehicle 100 may have various dynamic dimensions (dimensions/classes that vary in value) and may be influenced by various factors, e.g., time and travel. Accordingly, the processor 930 may improve performance of the object detection model by combining various environment-specific trained visual prompts with the driving image. The processor 930 may combine the trained visual prompts with the driving image by assign respective weights the trained visual prompts.

The processor 930 may select trained visual prompts appropriate for pieces of data from among the trained visual prompts and assign respectively corresponding weights (e.g., relative ratios) to the selected visual prompts to combine the selected trained visual prompts with the driving image. Here, "weight" may refer to a combining (or compositing/synthesis) ratio between the selected visual prompts.

For example, a weight may correspond to importance of a factor to be considered when the processor 930 performs object detection (i.e., a factor that affects object detection). That is, weights may be set for visual prompts to reflect their impact (or more specifically, the impact of their corresponding environment) on object detection. For example, object detection performance degradation may be more likely when object detection is performed on a driving image of highway on a rainy day during nighttime hours than on a highway on a clear day during daylight hours. Thus, weights for those trained visual prompts may be set relatively higher when generating a composite merged image.

Figure 2:
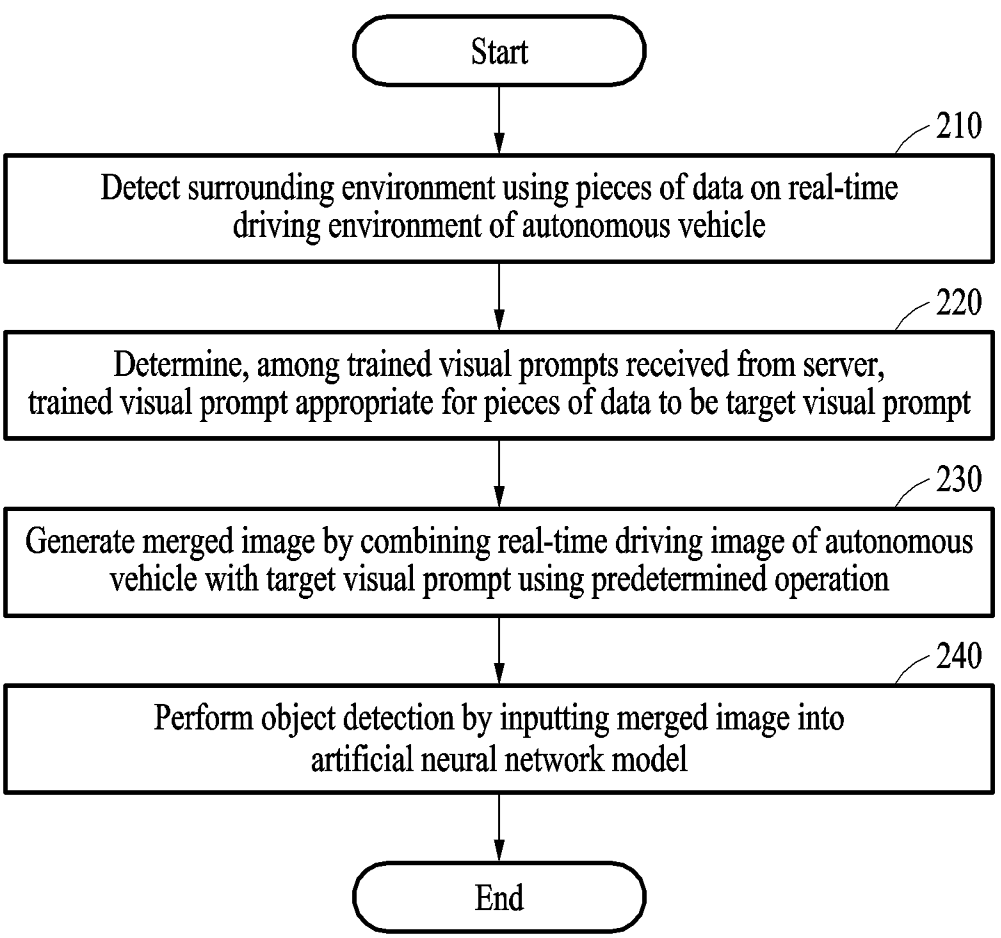
FIG. 2 illustrates example operations of a processor of an autonomous vehicle, according to one or more embodiments.

FIG. 2 illustrates example operations of a processor of an autonomous vehicle, according to one or more embodiments.

The description provided with reference to FIG. 1 generally applies to FIG. 2. Although examples are described herein with reference to autonomous vehicles, embodiments and implementations are not limited to autonomous vehicles; the wider general applicability (e.g., for any scenario of real-time object detection) of the techniques described is self-evident.

In operation 210, the processor 930 may detect a surrounding environment using pieces of data indicative of the driving environment of the autonomous vehicle 100 (the pieces of data may indicate different dimensions of the driving environment, e.g., weather, setting, time of day, etc.).

The driving image may be obtained from cameras (e.g., 110). The pieces of data (current driving environment data) on the driving environment may be (i) sensed information obtained from sensors (e.g., 120) included in the autonomous vehicle 100, and/or may be (ii) driving information obtained by the autonomous vehicle 100 through the communicator 130. Such driving information may include, for example, a weather forecast, a traffic environment, a traffic regulation, and a traffic signal system, or the like, any of which may by determined based on a driving location (e.g., current, near-recent, or near-predicted) of the autonomous vehicle 100. For example, rules about left-hand or right-hand traffic, road signs, the shapes of vehicles, etc. may vary from one location to another (e.g., in different countries). Moreover, some countries/locales may have a greater number of bikes, while others may have a greater number of trucks. The widths and shapes of lanes may vary from locale to locale. Therefore, the driving information may include comprehensive information about traffic. The driving information may be obtained via a network from a server or cloud service, from a local database/service, and so forth.

In operation 220, the processor 930 may determine/select, among the trained visual prompts received from the server 140, a target visual prompt appropriate for the pieces of data. The visual prompt may be selected dynamically as appropriate according to the environment in which the vehicle is driving. For example, if the vehicle is driving in rain, the vehicle's rain sensor may provide information to this effect, which may allow the vehicle's processor to select a visual prompt related to the rain. Generation of trained visual prompts by the server 140 is described with reference to FIG. 3, among other places. Also, the server 140 may instead be a cloud service, a separate local system (e.g., for autonomous vehicles that may have additional high capacity computing hardware), etc.

In operation 230, the processor 930 may generate a merged image by combining a driving image of the autonomous vehicle 100 with the target visual prompt using a predetermined operation.

The predetermined operation may include adding and/or concatenating the target visual prompt to the driving image.

In operation 240, the processor 930 may perform object detection by inputting the merged image into a neural network model that has been trained for object detection. Although "object detection" is used as an example, the neural network model may be trained for object recognition/classification, object location (e.g., segmentation or bounding), and so forth.

The processor 930 may select target visual prompts appropriate for the pieces of data from among the trained visual prompts, assign a weight to each of the selected target visual prompts, and combine the visual prompts, according to their respective weights, with the driving image. To reiterate, as mentioned above, based on data obtained from various sensors of the vehicle, the vehicle's processor may search and select an appropriate visual prompt. For example, if the vehicle is driving on a snow highway, the vehicle's processor may determine that the vehicle is driving on the snowy highway based on a camera sensor and GPS, and may select and combine the appropriate visual prompt with an appropriate weight (ratio).

Figure 3:
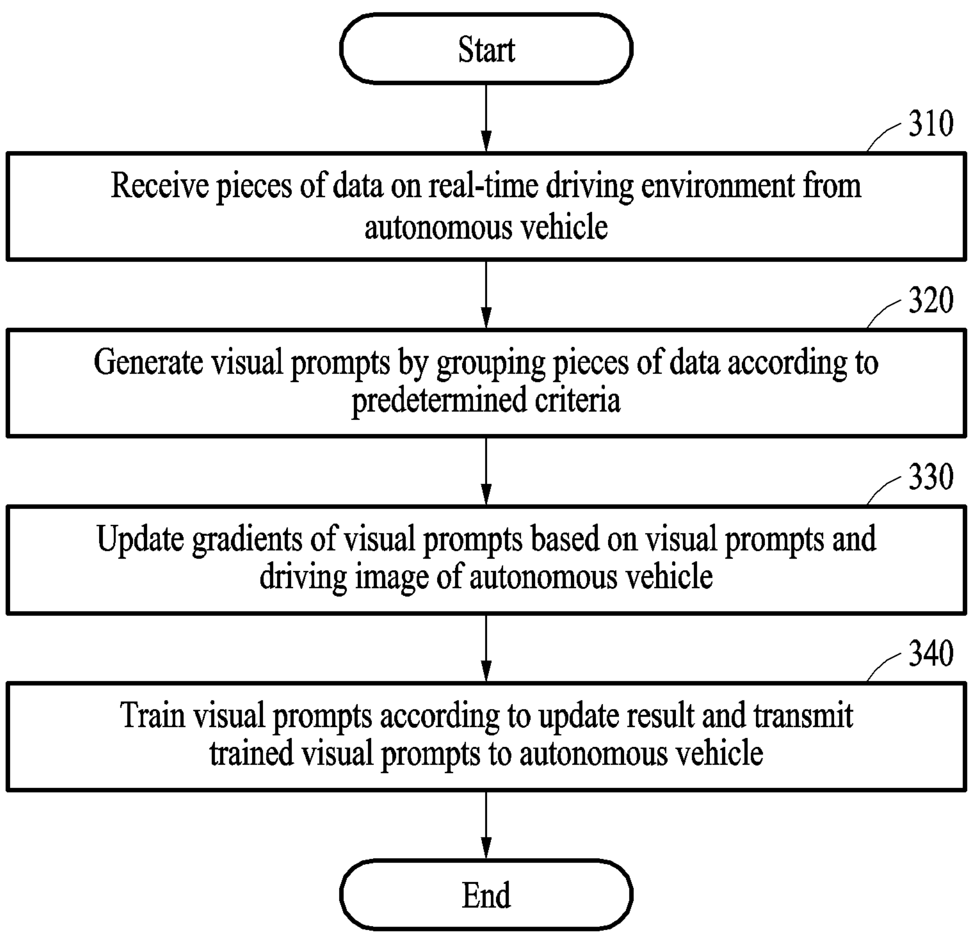
FIG. 3 illustrates an example operations of a server, according to one or more embodiments.

FIG. 3 illustrates example operations of a server, according to one or more embodiments. The operations may relate to generating visual prompts for autonomous vehicles.

The description provided with reference to FIGS. 1 and 2 is generally applicable to FIG. 3.

In operation 310, the server 140 may receive pieces of data on a driving environment from the autonomous vehicle 100. In some cases, described further below, the server 140 might also receive from the autonomous vehicle 100 an indication of an uncertainty level of object detection that has occurred at the autonomous vehicle 100 (e.g., as an output of the autonomous vehicle's object detection neural network model).

In operation 320, the server 140 may group the pieces of data according to predetermined criteria (e.g., predetermined group categories) for the eventual purpose of generating visual prompts.

The predetermined criteria may include criteria for grouping the pieces of data into categories based on the types of the pieces of data. The categories may include, as non-limiting examples, any one or any combination of (i) driving time of the autonomous vehicle 100, surrounding weather of the autonomous vehicle 100, and setting of the autonomous vehicle 100. The server 140 may label the visual prompts based on the categories. That is, the server 140 may generate a visual prompt for a category and label the visual prompt with its category.

In operation 330, the server 140 may update gradients of the visual prompts based on the visual prompts and a corresponding driving image of the autonomous vehicle 100 (e.g., one corresponding in time/location to the pieces of data).

The server 140 may perform operations related to a new driving environment when it determines that an uncertainty level of an object detection result received from the autonomous vehicle 100 is greater than or equal to a threshold value; based thereon the server 140 may update the gradients of the visual prompts by using a test-time adaptation technique, described next. Regarding the uncertainty level, as discussed above, the object detection model included in the vehicle may be receiving vehicle-sensed environment data while the vehicle is driving in an environment where the model cannot operate properly, for example, because the object detection model may not have been sufficiently trained for that environment. The uncertainty level may reflect that the accuracy of the object detection model cannot be guaranteed only by pre-received learned visual prompts. There are many ways to estimate uncertainty. As one example, when random dropouts (failures) are occurring, there may be a difference from the results for other dropouts. As another example, the results with other reliable models may be compared. Other methods of obtaining uncertainty may be employed.

For example, when the autonomous vehicle 100 detects a new environmental condition that was not previously used to train a visual prompt, e.g., the uncertainty level of the object detection result (of an object detection model on a driving image) is greater than or equal to the threshold value, obtaining and labeling data locally may be challenging in that condition. With the test-time (new/difficult environment) adaptation technique, the autonomous vehicle 100 may obtain test-time images (driving images) and pieces of data in the new environmental condition (e.g., a different country or an unfamiliar environment) and transmit the test-time images (driving images) and pieces of data to the server 140. In response, the server 140 may perform self-supervised learning on the test-time driving images because the received test-time images have no annotation (due to the poor object detection results at the autonomous vehicle).

For additional understanding, the test-time technique is a supplemental technique that may be employed by the vehicle if the SOC of the vehicle develops. If the dropout technique (mentioned above) or the comparison of model results can be performed in the vehicle, the test time technique can be performed in the vehicle, although it can also be performed more accurately by the server.

Incidentally, regarding self-supervised learning, this is a type of representation learning that aims to obtain a good representation from unlabeled data. A model may be trained by autonomously selecting what may be used as a target within an input even without labels. Therefore, self-supervised learning may also be referred to as a pretext task. Self-supervised learning may be performed through an intra-sample prediction scheme of predicting one part through another part within a single data sample or an inter-sample prediction scheme of predicting a relationship between data samples within a batch.

Accordingly, the server 140 may use self-supervised learning to generate visual prompts from the test-time driving images and from the corresponding pieces of data on the new environmental condition, and by such learning may label and train visual prompts for the new environmental condition. The server 140 may label and train visual prompts for the new environmental condition by comparing the visual prompts for the new environmental condition with visual prompts that have been previously trained in existing other driving environments. When the visual prompts for the new environmental condition are generated, they may be used by the server 140 to generate trained visual prompts for the new environmental condition (which are transmitted to the autonomous vehicle as the trained visual prompts to be used thereby for the new environmental conditions). In other words, in operation 340, the server 140 may train the visual prompts based on a result of the update and transmit the trained visual prompts to the autonomous vehicle 100.

The server 140 may compare a stored reference visual prompt and each of the visual prompts to tune parameters of each of the visual prompts based on the gradients of the differences between the reference and visual prompts and store the parameters of each of the visual prompts in each of the visual prompts.

Although the server 140 is described above as training visual prompts, when a system on chip (SoC) and/or a graphics processing unit (GPU) capable of performing the above-described server operations are provided with the processor 930 and/or the autonomous vehicle 100, the processor 930 or the autonomous vehicle 100 may autonomously perform training of the visual prompts without communicating with the server 140. Thus, the processor 930 may obtain the pieces of data on the driving environment of the autonomous vehicle 100, group the pieces of data according to predetermined criteria to generate visual prompts, and train the visual prompts to generate trained visual prompts based on the visual prompts and the driving image of the autonomous vehicle 100.

Figure 4:
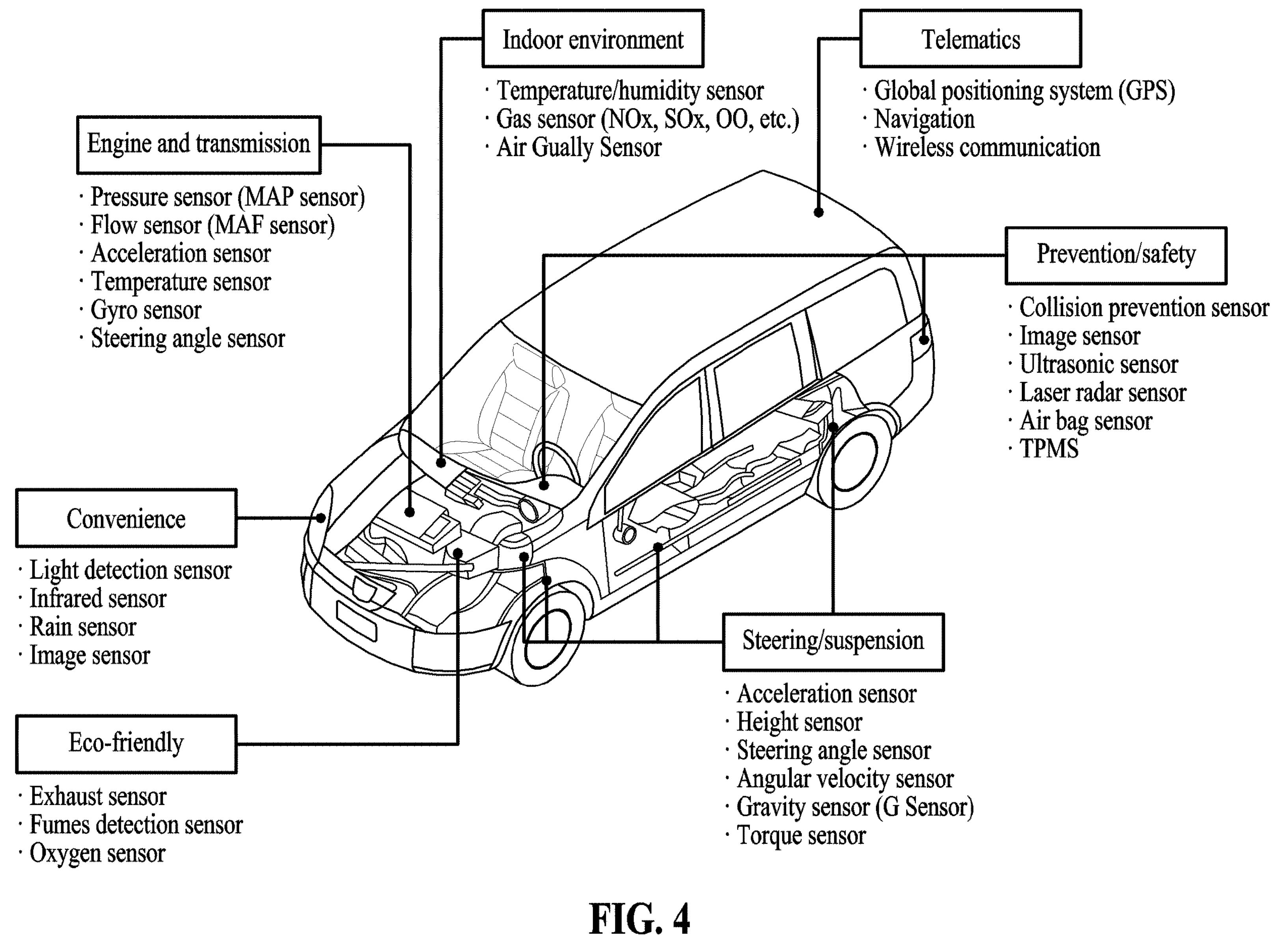
FIG. 4 illustrates examples of sensors mounted on an autonomous vehicle, according to one or more embodiments.

FIG. 4 illustrates examples of sensors mounted on an autonomous vehicle, according to one or more embodiments.

Referring to FIG. 4, an engine/motor and a transmission (if any) of the autonomous vehicle 100 may include, for example, a pressure sensor, a flow sensor, an acceleration sensor, a temperature sensor, a gyro sensor, and/or a steering angle sensor. In the case of an electric vehicle, other/additional sensors may be available. An eco-friendly device of the autonomous vehicle 100 may include, for example, an exhaust sensor, a fumes detection sensor, and/or an oxygen sensor. A convenience device of the autonomous vehicle 100 may include, for example, a light detection sensor, an infrared sensor, a rain sensor, and/or an image sensor. The indoor environment of the autonomous vehicle 100 may include, for example, a temperature/humidity sensor, a gas sensor, and/or an air quality sensor. Telematics of the autonomous vehicle 100 may include a global positioning system (GPS), navigation, and/or wireless communication. A prevention/safety device of the autonomous vehicle 100 may include, for example, a collision prevention sensor, an image sensor, an ultrasonic sensor, a laser radar sensor, an airbag sensor, and/or a tire-pressure monitoring system (TPMS) sensor. A steering/suspension system of the autonomous vehicle 100 may include, for example, an acceleration sensor, a height sensor, a steering angle sensor, an angular velocity sensor, a gravity sensor, and/or a torque sensor.

The autonomous vehicle 100 may also include sensors (e.g., 120) that are typically mounted on autonomous vehicles, and the examples above are not limited thereto.

The processor 930 may process pieces of data obtained from the sensor 120 included in the autonomous vehicle 100 and use the pieces of data as an input for an object detection model. Although sensor 120 is referred to in the singular, the term covers one or more sensors of possibly different types.

Figure 5:
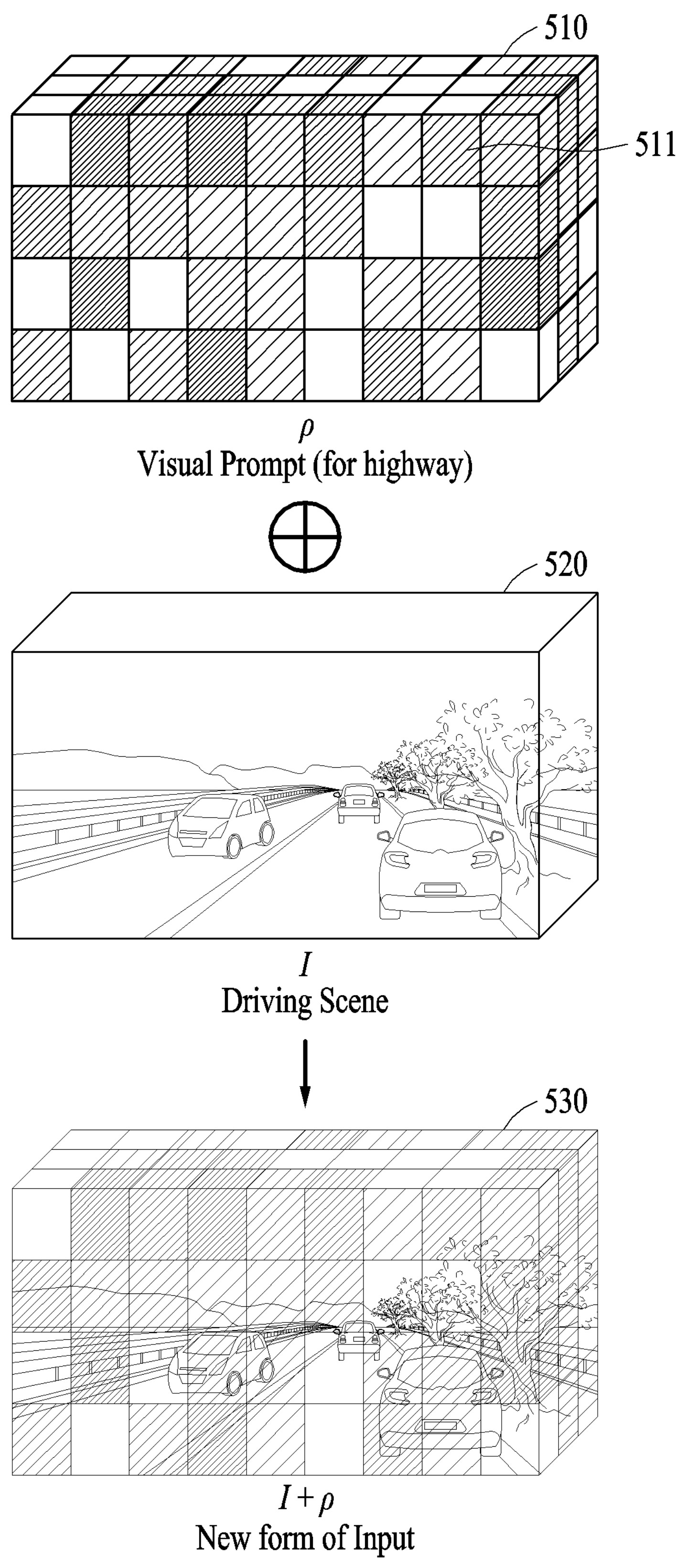
FIG. 5 schematically illustrates an example of a visual prompt, according to one or more embodiments.

FIG. 5 illustrates an example of a visual prompt, according to one or more embodiments.

The description provided with reference to FIGS. 1 to 4 is generally applicable to FIG. 5.

The processor 930 may generate a merged image 530 by combining a target visual prompt 510 with a driving image 520. The processor 930 may generate the merged image 530 by combining the driving image 520 of the autonomous vehicle 100 with the target visual prompt 510 using a predetermined operation. The predetermined operation may be an addition operation of combining a target prompt with a driving image. The addition operation may be performed by injecting the target visual prompt 510 to the driving image 520. Blocks 511 are visualizations of tuned parameters stored in a visual prompt.

The processor 930 may also perform a concat operation. The concat operation may be performed on the target visual prompt 510 and the driving image 520 in a channel direction.

The processor 930 may perform the predetermined operation when the channel dimension of the target visual prompt 510 is different from the channel dimension of the driving image 520. For example, it may be assumed that the data sizes of an input image (e.g., the driving image 520) and the target visual prompt 510 in the channel direction differ in that the data size of the input image is channel'×height×width (C'HW) and the data size of the target visual prompt 510 is CHW. It may also be assumed that the object detection model is configured (e.g., with an input layer) to receive inputs of data size CHW. The channel size of the merged image 530 obtained by performing the concat operation on the input image and the target visual prompt 510 may be C'+C. Therefore, the processor 930 may convert the channel size of the merged image 530 into the channel size (C) of the input of the object detection model to perform object detection, and to that end, training/inference that performs an 1×1 CONV operation may be performed. The server 140 or the processor 930 may perform the 1×1 CONV operation before the merged image 530 is input into the object detection model.

The processor 930, in addition to (or as an alternative to) adding the visual prompt to the driving image, may also generate a feature prompt (a feature-map analogue to a visual prompt) and add the feature prompt to each feature level in which a convolution operation is performed in the object detection model, the feature prompt having a size corresponding to the feature level. For example, when Conv1 (e.g., a first convolution layer) and Conv2 operations are performed, object detection may be performed by inserting a feature prompt into a feature map of an artificial neural network model after the Conv2 operation, the feature prompt having a size corresponding to the feature map. In other words, an operation of generating and adding a feature prompt may be performed on a feature map of an n-th layer.

Figure 6:
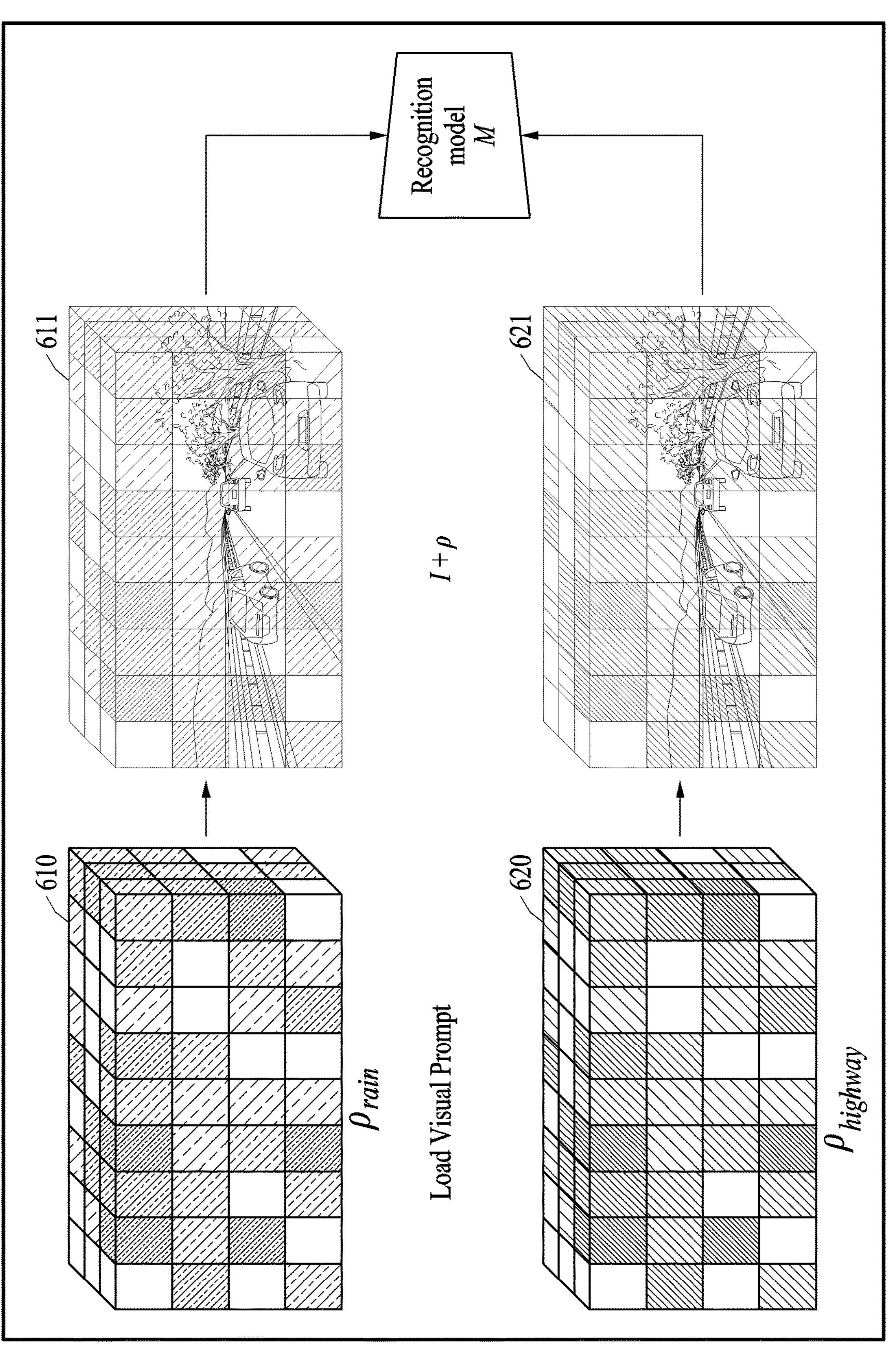
FIGS. 6 to 8 illustrate a composite merged image, according to one or more embodiments.
Figure 7:
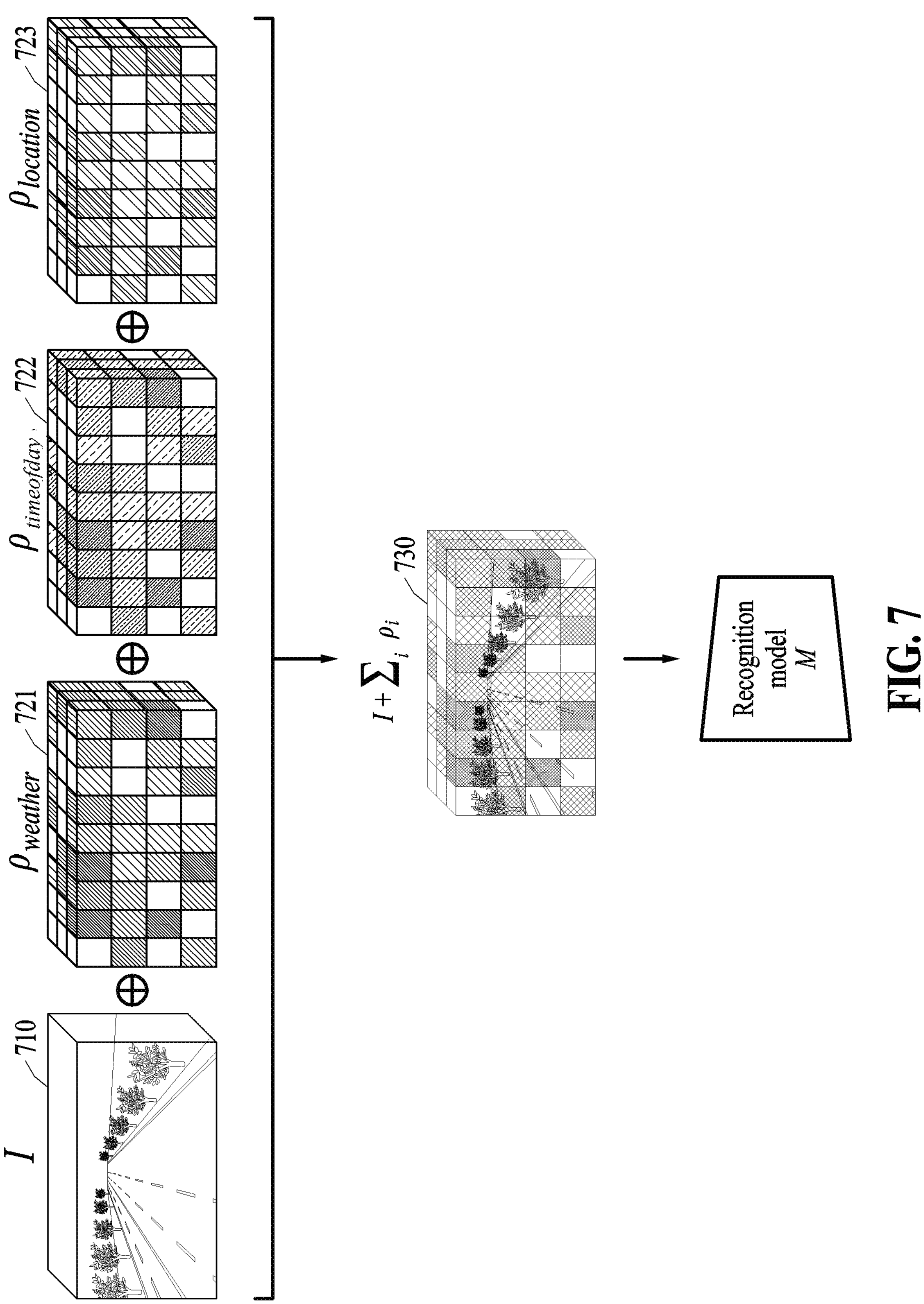
Figure 8:
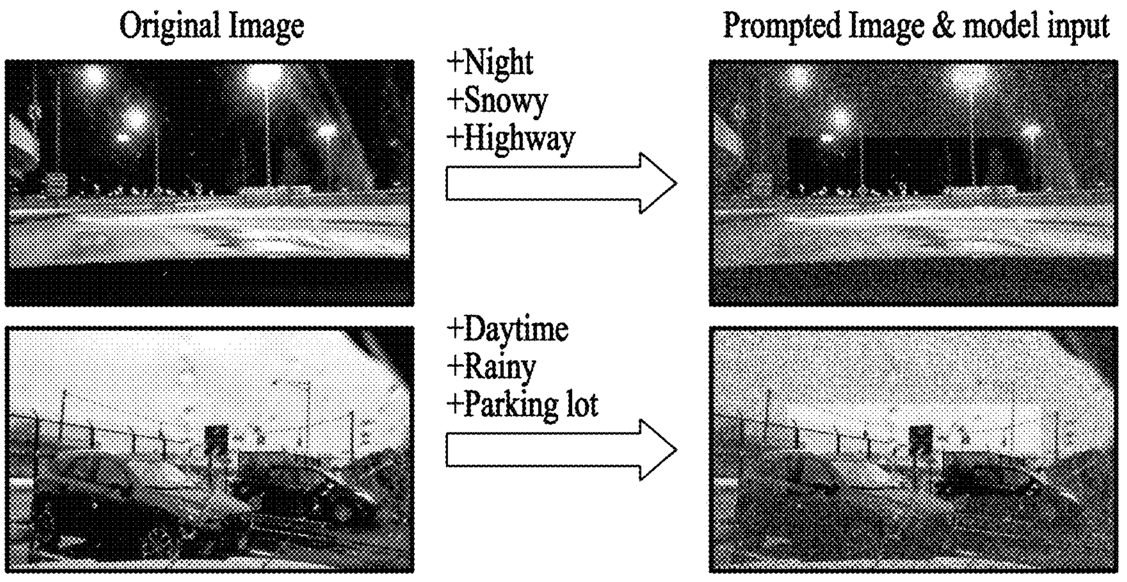

FIGS. 6 to 8 illustrate a composite merged image, according to one or more embodiments.

The description provided with reference to FIGS. 1 to 5 is generally applicable to FIGS. 6 to 8.

Referring to FIG. 6, the processor 930 of the autonomous vehicle 100 may generate merged images 611 and 621 by combining a driving image with each respective selected/determined visual prompts to perform object detection when the autonomous vehicle 100 drives in an environment that is rainy and on a highway. In other words, the processor 930 may generate the merged image 611 by combining the driving image 530 with a fourth visual prompt 610 ρ_weather-rainy and generate the merged image 621 by combining the driving image 530 with a fifth visual prompt 620 ρ_setting-highway. The processor 930 may perform object detection using the merged images 611 and 621 as an input for an object detection model. When using the merged images 611 and 621 as the input, the processor 930 may perform object detection by assigning a weight to each of the merged images 611 and 621 based on the importance of each of the merged images 611 and 621. The number of images that may be generated simultaneously or in parallel and input into the object detection model is not limited to two. The merging may be performed by a layer of the object recognition model, or may be performed in a preliminary stage such that the object recognition model receives the final merger of the visual-prompt-merged images.

Referring to FIG. 7, the depicted example assumes that the autonomous vehicle 100 is driving in a rainy urban area at night. The camera 110 of the autonomous vehicle 100 may capture a driving image 710 of the rainy urban area at night, and the sensor 120 and/or the communicator 130 of the autonomous vehicle 100 may collect pieces of data on the driving environment, i.e., the rainy urban area at night. The autonomous vehicle 100 may transmit the pieces of data on the driving environment to the server 140. The server 140 may generate trained visual prompts based on the received pieces of data. The trained visual prompts may be a sixth visual prompt 721 ρ_time-night, a seventh visual prompt 722 ρ_weather-rainy, and an eighth visual prompt 723 ρ_setting-urban. The processor 930 of the autonomous vehicle 100 may generate a composite merged image 730 by combining the trained visual prompts with the driving image 710. When generating the composite merged image 730, the processor 930 may assign a different weight to each of the trained visual prompts, resulting in a final image, input to the object recognition model, where the pixels of the final/input image are each a weighted combination of respective values of pixels in the visual prompts and a value of a respective pixel in the driving image.

For example, a higher weight may be assigned to a factor that is most likely to distract the autonomous vehicle 100 driving in the rainy urban area at night. Generally, “rain” is an environment factor that adversely affects the driving and object detection of a driving vehicle, and thus, assigning a higher weight to “rain” may improve the accuracy of object detection. In addition, an “urban area” is an environment in which various variables affect the driving and object detection of a vehicle, and thus, a higher weight may be assigned to the “urban area”. The processor 930 may perform object detection based on the composite merged image 730 obtained by combining the trained visual prompts to which weights are assigned, with the driving image 710. The number of trained visual prompts combined with a driving image is not limited to three as described in the example above.

Referring to FIG. 8, the processor 930 may generate composite merged images 811 and 821 by combining driving images 810 and 820 with visual prompts.

FIG. 9 illustrates an example electronic device, according to one or more embodiments.

Referring to FIG. 9, an electronic device 900 (e.g., the autonomous vehicle 100 and the server 140 of FIG. 1) may include the processor 930, a memory 950, and an output device 970 (e.g., a display). The processor 930, the memory 950, and the output device 970 may be connected to one another through a communication bus 905. In the above process, for ease of description, it is illustrated that the processor 930 is included in the autonomous vehicle 100. However, the server 140 may also include the processor 930 to perform at least one of the above-described methods or an algorithm corresponding to at least one of the above-described methods to operate the server 140. In practice the processor 930 may be a combination of processors, accelerators, cores, etc.

The output device 970 may display a user interface that receives a user input related to autonomous driving states and operation provided by the processor 930. The user interface may display information derived from the object detection model described above. For example, information about detected objects, graphic indicial of detected (or recognized) objects, and so forth, may be displayed.

The memory 950 may store pieces of data and visual prompts obtained from an object detection model, a sensor, and a communicator performed by the processor 930. Furthermore, the memory 950 may store a variety of information generated by the processor 930 as described above. In addition, the memory 950 may store a variety of data and programs. The memory 950 may include, for example, a volatile memory or a non-volatile memory (but not a signal per se). The memory 950 may include a high-capacity storage medium such as a hard disk to store a variety of data.

In addition, the processor 930 may perform at least one of the methods described with reference to FIGS. 1 to 8 or an algorithm corresponding to at least one of the methods. In the above process, it is illustrated that the processor 930 is included in the autonomous vehicle 100. However, the server 140 may also include the processor 930 to perform at least one of the above-described methods or an algorithm corresponding to at least one of the above-described methods to operate the server 140. The processor 930 may be a data processing device implemented by hardware including a circuit having a physical structure to execute desired operations. The desired operations may include, for example, code or instructions in a program. The processor 930 may be implemented as, for example, a central processing unit (CPU), a GPU, or a neural network processing unit (NPU). The electronic device 900 that is implemented as hardware may include, for example, a microprocessor, a CPU, a processor core, a multi-core processor, a multiprocessor, an ASIC, and an FPGA.

The processor 930 may execute a program and control the electronic device 900. Program code to be executed by the processor 930 may be stored in the memory 950.

The computing apparatuses, the vehicles, the electronic devices, the processors, the memories, the sensors, the vehicle/operation function hardware, the driving systems (e.g., autonomous or driver-assist), the displays, the information output system and hardware, the storage devices, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A computing device comprising:

one or more processors; and a memory storing instructions configured to cause the one or more processors to:

obtain, from a camera of a vehicle, a driving image;

receive, by the vehicle, via a network, driving environment information specific to a location of the vehicle;

obtain, from a sensor of the vehicle, data of a surrounding environment of the vehicle;

receive, from a server, trained visual prompts provided by the server based on the driving image and passed on the driving environment information and the surrounding environment information;

select, from among the trained visual prompts received from the server, a target visual prompt corresponding to the driving environment information and the data of the surrounding environment;

generate a merged image by combining the driving image with the target visual prompt using a predetermined operation; and perform object detection by inputting the merged image into a neural network model trained to perform object detection.

2. The computing device of claim 1, wherein the predetermined operation comprises adding the target visual prompt to the driving image or concatenating the target visual prompt with the driving image.

3. The computing device of claim 1, wherein the instructions are further configured to cause the one or more processors to select a second target visual prompt from among the trained visual prompts, assign weights to the target visual prompt and second target visual prompt, respectively, and use the weights to combine the selected target and second visual prompts with the driving image.

4. The computing device of claim 1, wherein the data of the surrounding environment and the driving environment information are classified into values of predefined environment classes of a current driving environment of the vehicle.

5. The computing device of claim 4, wherein the classified values are used to generate and train the visual prompts.

6. The computing device of claim 1, wherein the driving environment information comprises a weather forecast, a traffic condition, a traffic regulation, or a traffic signal system.

7. A server is configured to:

receive, via a network, from a vehicle, a driving image of the vehicle and current driving environment data of the vehicle;

classify components of the current driving environment data according to predetermined categorization criteria to generate values of driving environment categories;

generate visual prompts based on the values of the driving environment categories, each visual prompt respectively corresponding to a driving environment category and having content based on a respectively corresponding value in the corresponding driving environment category;

update the visual prompts according to gradients thereof that are determined based on the driving image of the vehicle;

train the visual prompts based on a result of the updating; and transmit the trained visual prompts via the network to the autonomous vehicle.

8. The server of claim 7, wherein the driving environment categories comprise a time-of-day, weather, or a setting.

9. The server of claim 8, wherein the server is configured to label the visual prompts based on the driving environment categories.

10. The server of claim 7, wherein the server is configured to, based on an uncertainty level of an object detection result received from the vehicle, update the gradients of the visual prompts by using a test image.

11. The server of claim 7, wherein the server is configured to compare a reference visual prompt stored in the server with each of the visual prompts to tune parameters of each of the visual prompts based on the gradients and store the tuned parameters of each of the visual prompts in each of the visual prompts.

12. The server of claim 7, wherein the visual prompts are respective tensors, wherein the gradients correspond to differences between the driving image and the tensors, and wherein values of the tensors are updated according to the gradients.

13. A method of controlling a vehicle, the method comprising:

detecting a surrounding environment using pieces of data on a driving environment of the vehicle and generating an indication of the surrounding environment;

determining, among trained visual prompts received via a network from a server, a target visual prompt corresponding to the pieces of data;

generating a merged image by combining a driving image of the autonomous vehicle with the target visual prompt using a predetermined operation; and performing object detection by inputting the merged image into a neural network model of the vehicle, the neural network model configured to infer objects from images inputted thereto.

14. The method of claim 13, wherein the predetermined operation comprises adding or concatenating the target visual prompt to the driving image.

15. The method of claim 13, wherein the generating of the merged image comprises:

selecting a second target visual prompt from among the trained visual prompts based on the pieces of data; and assigning weight to the target visual prompt and the second visual prompt and combining the target visual prompt and the second visual prompt with the driving image according to the weights.

16. The method of claim 13, further comprising:

generating an original visual prompt based on a value of a category of a driving environment category determined based on the pieces of data; and training the original visual prompt to generate one of the trained visual prompts, the training based on the original visual prompt and the driving image of the autonomous vehicle.

17. A method of controlling a server, the method comprising:

receiving, from a vehicle, pieces of data on a driving environment;

determining values of predefined driving environment categories based on the pieces of data and generating visual prompts according to the values of the predefined driving environment categories;

determining gradients of the visual prompts based on the visual prompts and based on a driving image of the vehicle;

updating the visual prompts according to the gradients;

training the visual prompts based on a result of the updating; and transmitting the trained visual prompts to the vehicle.

18. The method of claim 17, wherein the predefined driving environment categories include driving time-of-day, surrounding weather, and setting.

19. The method of claim 17, further comprising:

based on an uncertainty level of an object detection result received from the vehicle, updating the gradients of the visual prompts based on test data defined in advance.

20. The method of claim 17, wherein the updating of the gradients of the visual prompts comprises comparing a reference visual prompt stored in the server with each of the visual prompts to tune parameters of each of the visual prompts based on the gradients and store the parameters of each of the visual prompts in each of the visual prompts.

* * * * *